United States Patent
Yang et al.

(10) Patent No.: US 12,389,246 B2
(45) Date of Patent: Aug. 12, 2025

(54) METHOD AND APPARATUS FOR DETERMINING MEASUREMENT TARGET BASED ON CONFIGURATION INFORMATION, DEVICE, AND MEDIUM

(71) Applicant: VIVO MOBILE COMMUNICATION CO., LTD., Dongguan (CN)

(72) Inventors: Yu Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 369 days.

(21) Appl. No.: 17/723,434

(22) Filed: Apr. 18, 2022

(65) Prior Publication Data

US 2022/0248243 A1 Aug. 4, 2022

Related U.S. Application Data

(63) Continuation of application No. PCT/CN2020/131212, filed on Nov. 24, 2020.

(30) Foreign Application Priority Data

Nov. 29, 2019 (CN) .......................... 201911207265.8

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0626* (2013.01); *H04B 17/309* (2015.01); *H04W 24/10* (2013.01)

(58) Field of Classification Search
CPC .... H04W 24/08; H04W 24/10; H04B 17/309; H04B 7/0626
See application file for complete search history.

(56) References Cited

U.S. PATENT DOCUMENTS

| | | | |
|---|---|---|---|
| 11,881,905 B2* | 1/2024 | Onggosanusi | .......... H04L 5/005 |
| 2015/0208269 A1 | 7/2015 | Damnjanovic et al. | |

(Continued)

FOREIGN PATENT DOCUMENTS

| | | |
|---|---|---|
| CN | 108282212 A | 7/2018 |
| CN | 109392000 A | 2/2019 |

(Continued)

OTHER PUBLICATIONS

Extended European Search Report issued in related European Application No. 20892539.6, mailed Dec. 6, 2022, 14 pages.
(Continued)

*Primary Examiner* — Chandrahas B Patel
(74) *Attorney, Agent, or Firm* — IPX PLLC

(57) ABSTRACT

Embodiments of the present disclosure provide a method and an apparatus for determining a measurement target, a device, and a medium. The method for determining a measurement target, applied to a terminal device, includes: receiving configuration information from a network side device, where the configuration information includes that a parameter reportQuantity of a Channel State Information (CSI) report is set to null, and the configuration information is used by the terminal device to determine the measurement target, where the measurement target includes a Signal to Interference plus Noise Ratio (SINR) or a Reference Signal Received Power (RSRP); and determining the measurement target according to the configuration information.

19 Claims, 2 Drawing Sheets

(51) Int. Cl.
*H04B 17/309* (2015.01)
*H04W 24/10* (2009.01)

(56) References Cited

U.S. PATENT DOCUMENTS

| | | | |
|---|---|---|---|
| 2017/0332267 | A1 | 11/2017 | Kim et al. |
| 2019/0058517 | A1 | 2/2019 | Kang et al. |
| 2019/0165847 | A1 | 5/2019 | Kim et al. |
| 2019/0306924 | A1 | 10/2019 | Zhang et al. |
| 2021/0337415 | A1* | 10/2021 | Chen ................ H04L 5/005 |
| 2021/0368468 | A1* | 11/2021 | Xing ................ H04W 64/00 |
| 2022/0014957 | A1* | 1/2022 | Guo ................ H04W 72/21 |

FOREIGN PATENT DOCUMENTS

| | | |
|---|---|---|
| CN | 109644364 A | 4/2019 |
| CN | 110035447 A | 7/2019 |
| WO | 2018127149 A1 | 7/2018 |

OTHER PUBLICATIONS

Ericsson, "Draft CR on CPU occupancy rules for CSI-ReportConfig with higher layer paramter reportQunatity set to none" Nov. 2018, 3GPP TSG-RAN WG1 Meeting#95, R1-1814225, 2 pages.
International Search Report issued in corresponding International Application No. PCT/CN2020/131212, mailed Feb. 19, 2021, 4 pages.
VIVO, "Remaining issues on multi-beam transmission", 3GPP TSG RAN WG1 #99, R1-1912040, Nov. 22, 2019
First Office Action issued in related Chinese Application No. 201911207265.8, mailed Dec. 30, 2021, 10 pages.
Office Action issued in related European Application No. 20892539.6, mailed Nov. 29, 2024, 8 pages.
Apple Inc., "Feature Lead Summary 3 on SCell BFR and L1-SINR", 3GPP TSG-RAN WG Meeting #98bis, R1-1911549, Oct. 2019, 23 pages.

* cited by examiner

METHOD AND APPARATUS FOR DETERMINING MEASUREMENT TARGET BASED ON CONFIGURATION INFORMATION, DEVICE, AND MEDIUM

CROSS-REFERENCE TO RELATED APPLICATIONS

This application is a continuation of International Application No. PCT/CN2020/131212, filed Nov. 24, 2020, which claims priority to Chinese Patent Application No. 201911207265.8, filed Nov. 29, 2019. The entire contents of each of the above-referenced applications are expressly incorporated herein by reference.

TECHNICAL FIELD

Embodiments of the present disclosure relate to the field of communications technologies, and in particular to a method and an apparatus for determining a measurement target, a device, and a medium.

BACKGROUND

During beam measurement and selection, a commonly used parameter to measure beam quality is a Reference Signal Received Power (RSRP). To further improve accuracy of beam measurement and selection, especially in multi-cell, multi-user, and multi-beam scenes, it is necessary to measure a Signal to Interference plus Noise Ratio (SINR).

At present, for a Channel State Information (CSI) report, it is stipulated that when a parameter reportQuantity is set to a synchronization signal block-index-SINR (ssb-Index-SINR) or a channel state information-reference signal resource indicator-SINR (cri-SINR), a terminal device needs to perform SINR measurement.

However, a measurement target is not stipulated when the parameter reportQuantity is set to null.

SUMMARY

According to a first aspect, an embodiment of the present disclosure provides a method for determining a measurement target, applied to a terminal device, and including:
  receiving configuration information from a network side device, where the configuration information includes that a parameter reportQuantity of a CSI report is set to null, and the configuration information is used by the terminal device to determine the measurement target, where the measurement target includes SINR measurement or RSRP measurement; and
  determining the measurement target according to the configuration information.

According to a second aspect, an embodiment of the present disclosure provides a method for determining a measurement target, applied to a network side device, including:
  sending configuration information to a terminal device, where the configuration information includes that a parameter reportQuantity of a CSI report is set to null, and the configuration information is used by the terminal device to determine the measurement target, where the measurement target includes SINR measurement or RSRP measurement.

According to a third aspect, an embodiment of the present disclosure provides an apparatus for determining a measurement target, applied to a terminal device, and including:
  a receiving module, configured to receive configuration information from a network side device, where the configuration information includes that a parameter reportQuantity of a CSI report is set to null, and the configuration information is used by the terminal device to determine the measurement target, where the measurement target includes SINR measurement or RSRP measurement; and
  a first determining module, configured to determine the measurement target according to the configuration information.

According to a fourth aspect, an embodiment of the present disclosure provides an apparatus for determining a measurement target, applied to a network side device, including:
  a sending module, configured to send configuration information to a terminal device, where the configuration information includes that a parameter reportQuantity is set to null, and the configuration information is used by the terminal device to determine the measurement target, where the measurement target includes SINR measurement or RSRP measurement.

According to a fifth aspect, an embodiment of the present disclosure provides a terminal device, including: a memory, a processor, and a computer program that is stored in the memory and that can be run on the processor, where
  when the processor executes the computer program, the method for determining a measurement target according to the first aspect of the present disclosure is implemented.

According to a sixth aspect, an embodiment of the present disclosure provides a network side device, including: a memory, a processor, and a computer program that is stored in the memory and that can be run on the processor, where
  when the processor executes the computer program, the method for determining a measurement target according to the second aspect of the present disclosure is implemented.

According to a seventh aspect, an embodiment of the present disclosure provides a computer-readable storage medium, where the computer-readable storage medium stores a computer program, and when the computer program is executed by a processor, the method for determining a measurement target according to the first aspect or the second aspect of embodiments of the present disclosure is implemented.

BRIEF DESCRIPTION OF DRAWINGS

To describe the technical solutions in the embodiments of the present disclosure more clearly, the following briefly describes the accompanying drawings required to be used in the embodiments of the present disclosure. A person of ordinary skill in the art may still derive other drawings from these accompanying drawings.

DETAILED DESCRIPTION

The following describes the technical solutions in the embodiments of the present disclosure with reference to the accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
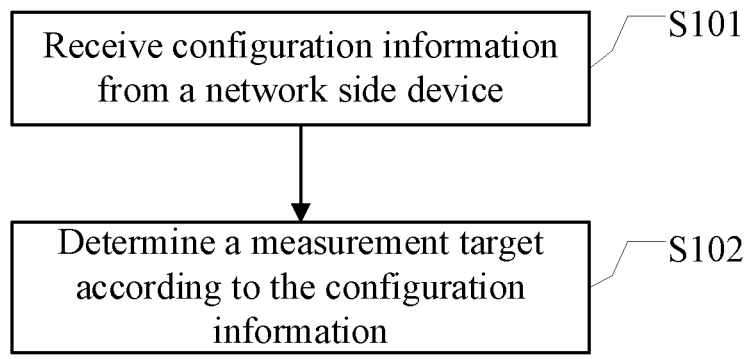
FIG. 1 is a schematic flow chart of a method for determining a measurement target, applied to a terminal device, according to an embodiment of the present disclosure.

FIG. 1 is a schematic flow chart of a method for determining a measurement target, applied to a terminal device, according to an embodiment of the present disclosure. As shown in FIG. 1, the method for determining a measurement target, applied to a terminal device, may include the following steps.

S101: Receive configuration information from a network side device, where the configuration information includes that a parameter reportQuantity of a CSI report is set to null (null), and the configuration information is used by the terminal device to determine the measurement target, where the measurement target includes SINR measurement or RSRP measurement.

S102: Determine the measurement target according to the configuration information.

In this embodiment of the present disclosure, the SINR may refer to a L1-SINR and the RSRP may refer to a L1-RSRP.

The network side device according to this embodiment of the present disclosure may be a base station, where the base station may be a frequently used base station, or an evolved node base station (eNB), or a device such as a network side device (for example, a next generation node base station (gNB) or a Transmission and Reception Point (TRP)) or a cell in the 5G system, or a network side device in a subsequent evolution communications system. In some embodiments, the terminal device may be a mobile phone, a tablet computer, a smart watch, a smart home appliance, or the like, which is not limited in this embodiment of the present disclosure.

In an embodiment of the present disclosure, the configuration information may include any one of the following:

a plurality of Reference Signal (RS) resource settings; at least one RS resource setting used for channel measurement and at least one RS resource setting used for interference measurement; at least one Channel Measurement Resource (CMR) setting and at least one Interference Measurement Resource (IMR) setting; or CMR information and IMR information.

In this case, the terminal device determines that the measurement target is SINR measurement, and then performs the SINR measurement.

In an embodiment of the present disclosure, the configuration information may include any one of the following:
one RS resource setting; one RS resource setting used for RSRP measurement; one CMR setting; or CMR information.

In this case, the terminal device determines that the measurement target is the RSRP measurement, and then performs the RSRP measurement.

In an embodiment of the present disclosure, when the measurement target is the SINR measurement, the configuration information is further used to indicate that a quantity ratio of the CMR to the IMR included in the RS resource is a preset ratio. In this case, the terminal device may determine, according to the configuration information, that the quantity ratio of the CMR to the IMR is the preset ratio.

In an embodiment of the present disclosure, when the measurement target is the SINR measurement, the terminal device may further determine the time occupied by a CSI processing unit required for the CSI report including a SINR measurement result.

In an embodiment of the present disclosure, if the CSI report including the SINR measurement result is a semi-persistent CSI report, the time occupied by the CSI processing unit required for the CSI report including the SINR measurement result is from a first symbol to a second symbol.

The first symbol is a $1^{st}$ symbol in the earliest transmission occasion of a first RS resource and a second RS resource used for SINR calculation.

The second symbol is a $Z_i^{'th}$ symbol after the last symbol of the latest RS resource in the transmission occasion of the first RS resource and the second RS resource used for the SINR calculation.

The first RS resource is a periodic or semi-persistent channel state information-reference signal (CSI-RS) resource or a Synchronization Signal and PBCH block (SSB) resource used for channel measurement.

The second RS resource is a periodic or semi-persistent CSI-RS resource or SSB resource used for the interference measurement.

That is, the time occupied by the CSI processing unit required for the semi-persistent CSI report is: from the first symbol used for SINR calculation, in the earliest transmission occasion of the periodic or semi-persistent CSI-RS resource or SSB resource used for channel measurement and a periodic or semi-persistent CSI-RS resource or SSB resource used for interference measurement, to a $Z_i^{'th}$ symbol used for SINR calculation after the last symbol of the latest RS resource in a transmission occasion of the periodic or semi-persistent CSI-RS resource or SSB resource used for channel measurement and the periodic or semi-persistent CSI-RS resource or SSB resource used for interference measurement.

In an embodiment of the present disclosure, the value of i may be 1.

In an embodiment of the present disclosure, if the CSI report including the SINR measurement result is an aperiodic CSI report, the time occupied by the CSI processing unit required for the CSI report is from a third symbol to a fourth symbol.

The third symbol is a $1^{st}$ symbol after a physical downlink control channel (PDCCH) configured to trigger the CSI report.

The fourth symbol is the last symbol between a $Z_j^{th}$ symbol and a $Z_j^{'th}$ symbol.

The $Z_j^{th}$ symbol is a $Z_j^{th}$ symbol after the first symbol after the PDCCH configured to trigger the CSI report.

The $Z_j^{'th}$ symbol is a $Z_j^{'th}$ symbol after the last symbol of the latest RS resource between a third RS resource and a fourth RS resource used for the SINR calculation.

The third RS resource is a periodic or semi-persistent CSI-RS resource or SSB resource used for the channel measurement.

The fourth RS resource is a periodic or semi-persistent CSI-RS resource or SSB resource used for the interference measurement.

That is, the time occupied by the CSI processing unit required for the aperiodic CSI report is: from the first symbol after a PDCCH configured to trigger a CSI report to the last symbol between the $Z_j^{th}$ symbol after the first symbol after the PDCCH configured to trigger the CSI report and the $Z_j^{'th}$ symbol, used for SINR calculation, after the last symbol of the latest RS resource in the periodic or semi-persistent CSI-RS resource or SSB resource used for channel measurement and in the periodic or semi-persistent CSI-RS resource or SSB resource used for interference measure.

In an embodiment of the present disclosure, the value of j may be 1.

In an embodiment of the present disclosure, when the measurement target is SINR measurement, a configuration parameter of a channel state information-reference signal resource set (CSI-RS resource set) (such as a CMR resource set) used for channel measurement in the configuration information does not include a tracking reference signal information (trs-info) parameter, and/or a configuration parameter of the CSI-RS resource set (such as an IMR resource set) used for interference measurement in the configuration information does not include the trs-info parameter.

In an embodiment of the present disclosure, when the measurement target is the RSRP measurement, the terminal device may further determine the time occupied by a CSI processing unit required for a CSI report including a RSRP measurement result.

In an embodiment of the present disclosure, if the CSI report including the RSRP measurement result is a semi-persistent CSI report, the time occupied by the CSI processing unit required for the CSI report including the RSRP measurement result is from a fifth symbol to a sixth symbol.

The fifth symbol is a $1^{st}$ symbol in the earliest transmission occasion of a fifth RS resource used for RSRP calculation.

The sixth symbol is a $Z_3^{'th}$ symbol after the last symbol of the latest RS resource in the transmission occasion in the fifth RS resource used for the RSRP calculation.

The fifth RS resource is a periodic or semi-persistent CSI-RS resource or SSB resource used for the RSRP measurement.

That is, the time occupied by the CSI processing unit required for the semi-persistent CSI report is: from the first symbol used for RSRP calculation in the earliest transmission occasion of the periodic or semi-persistent CSI-RS resource or SSB resource used for RSRP measurement to a $Z_3'$ symbol used for RSRP calculation after the last symbol of the latest RS resource in the transmission occasion of the periodic or semi-persistent CSI-RS resource or SSB resource used for RSRP measurement.

In an embodiment of the present disclosure, if the CSI report including the RSRP measurement result is an aperiodic CSI report, the time occupied by the CSI processing unit required for the CSI report including the RSRP measurement result is from a seventh symbol to an eighth symbol.

The seventh symbol is a $1^{st}$ symbol after a PDCCH configured to trigger the CSI report.

The eighth symbol is the last symbol between the $Z_3^{th}$ symbol and the $Z_3^{'th}$ symbol.

The $Z_3^{th}$ symbol is a $Z_3^{th}$ symbol from the first symbol after the PDCCH configured to trigger the CSI report.

The $Z_3^{'th}$ symbol is a $Z_3^{'th}$ symbol after the last symbol of the latest resource in the CSI-RS resource or SSB resource used for the RSRP measurement.

That is, the time occupied by the CSI processing unit required for the aperiodic CSI report is: from the first symbol after the PDCCH configured to trigger the CSI report to the last symbol between the $Z_3^{th}$ symbol after the first symbol after the PDCCH configured to trigger the CSI report and the $Z_3^{'th}$ symbol after the last symbol of the latest resource in the CSI-RS resource or SSB resource used for RSRP measurement.

In an embodiment of the present disclosure, when the measurement target is the RSRP measurement, a configuration parameter of the CSI-RS resource set used for channel measurement in the configuration information does not include a trs-info parameter.

Figure 2:
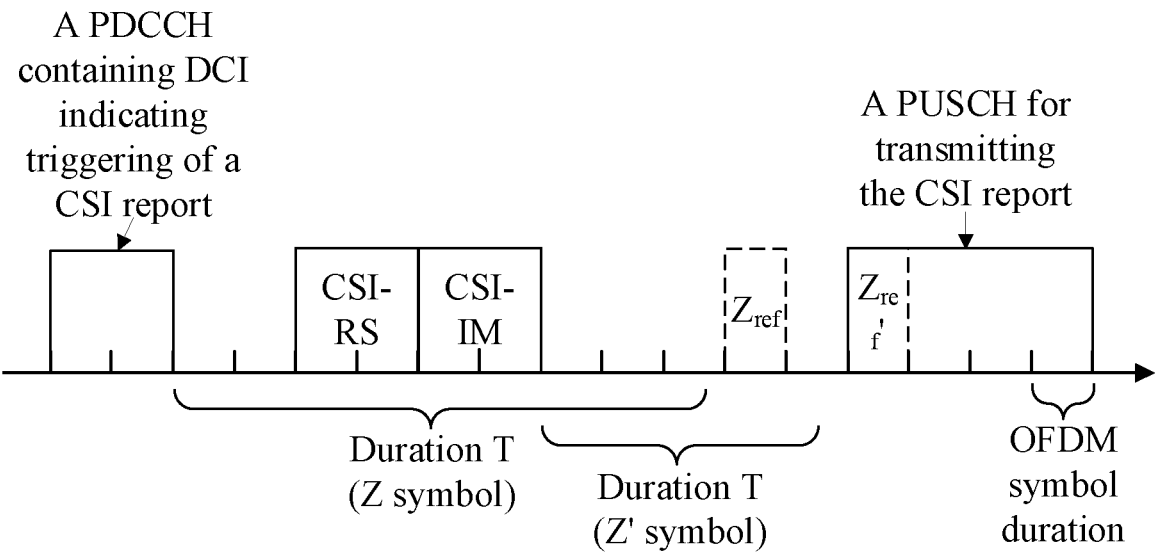
FIG. 2 is an exemplary schematic diagram of an aperiodic CSI report trigger timing sequence according to an embodiment of the present disclosure.

A value of (Z, Z') will be described below with reference to FIG. 2. FIG. 2 is an exemplary schematic diagram of an aperiodic CSI report trigger timing sequence according to an embodiment of the present disclosure.

When a CSI request field (CSI request field) in Downlink Control Information (DCI) triggers one or more CSI reports transmitted through a Physical Uplink Shared Channel (PUSCH), a terminal device needs to provide effective CSI reports when the following conditions are met:

If timing advance is considered, a first uplink symbol for transmission of a CSI report is not earlier than a symbol $Z_{ref}$ and not earlier than a symbol $Z_{ref}'$. $Z_{ref}$ is defined as a next uplink symbol, namely a start time of a Cyclic prefix (CP) is at T seconds after the last symbol of a PDCCH configured to trigger the CSI report.

When a triggered CSI report n is based on an aperiodic CSI-RS, $Z_{ref}'$ is defined as a next uplink symbol, namely a start time of the CP is at T' seconds after the last symbol of an aperiodic CSI-RS used for channel measurement, an aperiodic CSI interference measurement (CSI-IM) for interference measurement, and an aperiodic Non-Zero Power (NZP) CSI-RS used for interference measurement.

Z and Z' are defined as $$Z = \max_{m=0,\ldots,M-1}(Z(m)) \text{ and } Z' = \max_{m=0,\ldots,M-1}(Z'(m)),$$

where M is the number of updated CSI reports, and (Z(m), Z'(m)) corresponds to the time occupied by a CSI processing unit corresponding to an $m^{th}$ updated CSI report.

In the prior art, conditions under which a value of (Z, Z') is a value of ($Z_1$, $Z_1'$) are as follows:

(1) when L=0 processing units are occupied and CSI to be transmitted is a single piece of CSI and the CSI corresponds to wideband frequency-granularity, the CSI is triggered without a transmission block and/or a PUSCH of hybrid automatic repeat request acknowledgment, where the CSI corresponds to at most 4 CSI-RS ports in a single resource, and there is no CRI report, a CodebookType parameter is set to "typeI-SinglePane" or a parameter reportQuantity is set to "cri-RI-CQI"; and (2) the CSI to be transmitted corresponds to the broadband frequency-granularity, where the CSI corresponds to at most 4 CSI-RS ports in a single resource, and there is no CRI report, the CodebookType parameter is set to the typeI-SinglePane or the parameter reportQuantity is set to the cri-RI-CQI.

A condition in which a value of (Z, Z') is a value of ($Z_3$, $Z_3'$) is as follows:
   the reportQuantity is set to cri-RSRP or ssb-Index-RSRP.
A condition that a value of (Z, Z') is a value of ($Z_2$, $Z_2'$) is as follows:
   a condition other than conditions for the foregoing two groups of values.

According to the foregoing description of the values of Z and Z', it can be seen that in the prior art, values of the Z and Z' are not defined in SINR measurement. For the $Z_i'^{th}$, $Z_j^{th}$, $Z_j'^{th}$ symbols mentioned in the time occupied by the CSI processing unit during the SINR measurement in this embodiment of the present disclosure, values of i and j may both be 1, that is, the value of (Z, Z') is ($Z_1$, $Z_1'$) during the SINR measurement.

In other words, when the measurement target determined by the terminal device according to the configuration information provided in this embodiment of the present disclosure is the SINR measurement, the value of (Z, Z') may also be determined as ($Z_1$, $Z_1'$). That is, the following condition needs to be added to the conditions under which the value of (Z, Z') is ($Z_1$, $Z_1'$): the reportQuantity is set to null, and at least one RS resource setting used for channel measurement and at least one RS resource setting used for interference measurement are configured.

An embodiment of the present disclosure further provides a method for determining a measurement target, applied to a network side device. The method for determining a measurement target, applied to a network side device, may include the following step.

Send configuration information to a terminal device, where the configuration information includes that a parameter reportQuantity of a CSI report is set to null, and the configuration information is used by the terminal device to determine the measurement target, where the measurement target includes SINR measurement or RSRP measurement.

In an embodiment of the present disclosure, the configuration information may include any one of the following:
   a plurality of RS resource settings; at least one RS resource setting used for channel measurement and at least one RS resource setting used for interference measurement; at least one CMR setting and at least one IMR setting; or CMR information and IMR information.

In an embodiment of the present disclosure, the configuration information is further used to indicate that a quantity ratio of the CMR to the IMR included in the RS resource is a preset ratio.

In an embodiment of the present disclosure, the time occupied by the CSI processing unit required for the CSI report may further by determined by the network side device; and a CSI report includes an SINR measurement result.

In an embodiment of the present disclosure, the CSI report is a semi-persistent CSI report; and the time occupied by the CSI processing unit required for the CSI report is from a first symbol to a second symbol.

The first symbol is a $1^{st}$ symbol in the earliest transmission occasion of a first RS resource and a second RS resource used for SINR calculation.

The second symbol is a $Z_i'^{th}$ symbol after the last symbol of the latest RS resource in a transmission occasion of the first RS resource and the second RS resource used for the SINR calculation.

The first RS resource is a periodic or semi-persistent CSI-RS resource or SSB resource used for channel measurement.

The second RS resource is a periodic or semi-persistent CSI-RS resource or SSB resource used for the interference measurement.

In an embodiment of the present disclosure, the CSI report is an aperiodic CSI report; and the time occupied by the CSI processing unit required for the CSI report is from a third symbol to a fourth symbol.

The third symbol is a $1^{st}$ symbol after a PDCCH configured to trigger the CSI report.

The fourth symbol is the last symbol between a $Z_j^{th}$ symbol and a $Z_i'^{th}$ symbol.

The $Z_j^{th}$ symbol is a $Z_j^{th}$ symbol after the first symbol after the PDCCH is configured to trigger the CSI report.

The $Z_j'^{th}$ symbol is a $Z_j'^{th}$ symbol after the last symbol of the latest RS resource between a third RS resource and a fourth RS resource used for the SINR calculation.

The third RS resource is a periodic or semi-persistent CSI-RS resource or SSB resource used for the channel measurement.

The fourth RS resource is a periodic or semi-persistent CSI-RS resource or SSB resource used for the interference measurement.

In an embodiment of the present disclosure, a configuration parameter of a CSI-RS resource set used for channel measurement in the configuration information does not include a trs-info parameter, and/or a configuration parameter of a CSI-RS resource set used for interference measurement in the configuration information does not include the trs-info parameter.

In an embodiment of the present disclosure, the configuration information may include any one of the following:
   one RS resource setting; one RS resource setting used for RSRP measurement; one CMR setting; or CMR information.

In an embodiment of the present disclosure, the time occupied by the CSI processing unit required for the CSI report may further by determined by the network side device. The CSI report includes an RSRP measurement result.

In an embodiment of the present disclosure, if the CSI report including the RSRP measurement result is a semi-persistent CSI report, the time occupied by the CSI processing unit required for the CSI report including the RSRP measurement result is from a fifth symbol to a sixth symbol.

The fifth symbol is a $1^{st}$ symbol in the earliest transmission occasion of a fifth RS resource used for RSRP calculation.

The sixth symbol is a $Z_3'^{th}$ symbol after the last symbol of the latest RS resource in the transmission occasion in the fifth RS resource used for the RSRP calculation.

The fifth RS resource is a periodic or semi-persistent CSI-RS resource or SSB resource used for the RSRP measurement.

In an embodiment of the present disclosure, if the CSI report including the RSRP measurement result is an aperiodic CSI report, the time occupied by the CSI processing unit required for the CSI report including the RSRP measurement result is from a seventh symbol to an eighth symbol.

The seventh symbol is a $1^{st}$ symbol after a PDCCH configured to trigger the CSI report.

The eighth symbol is the last symbol between the $Z_3^{th}$ symbol and the $Z_3'^{th}$ symbol.

The $Z_3^{th}$ symbol is a $Z_3^{th}$ symbol from the first symbol after the PDCCH configured to trigger the CSI report.

The $Z_3^{tth}$ symbol is a $Z_3^{tth}$ symbol after the last symbol of the latest resource in the CSI-RS resource or SSB resource used for the RSRP measurement.

In an embodiment of the present disclosure, a configuration parameter of the CSI-RS resource set in the configuration information does not include a trs-info parameter.

It can be understood that the symbols in this embodiment of the present disclosure may be Orthogonal Frequency Division Multiplexing (OFDM) symbols.

Figure 3:
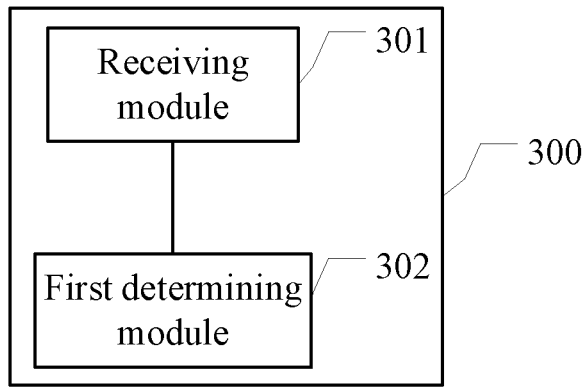
FIG. 3 is a schematic structural diagram of an apparatus for determining a measurement target, applied to a terminal device, according to an embodiment of the present disclosure.

An embodiment of the present disclosure further provides an apparatus for determining a measurement target, applied to a terminal device. FIG. 3 is a schematic structural diagram of an apparatus for determining a measurement target, applied to a terminal device, according to an embodiment of the present disclosure. As shown in FIG. 3, the apparatus 300 for determining a measurement target, applied to a terminal device, may include:

a receiving module 301, configured to receive configuration information from a network side device, where the configuration information includes that a parameter reportQuantity of a CSI report is set to null, and the configuration information is used by the terminal device to determine the measurement target, where the measurement target includes SINR measurement or RSRP measurement; and a first determining module 302, configured to determine the measurement target according to the configuration information.

In an embodiment of the present disclosure, the configuration information may include any one of the following:

a plurality of RS resource settings; at least one RS resource setting used for channel measurement and at least one RS resource setting used for interference measurement; at least one CMR setting and at least one IMR setting; or CMR information and IMR information.

The first determining module 302 may be specifically configured to determine that the measurement target is the SINR measurement.

In an embodiment of the present disclosure, the apparatus 300 for determining a measurement target, applied to a terminal device, may further include:

a second determining module, configured to determine, according to the configuration information, that a quantity ratio of the CMR to the IMR is a preset ratio.

In an embodiment of the present disclosure, the apparatus 300 for determining a measurement target, applied to a terminal device, may further include:

a third determining module, configured to determine the time occupied by a CSI processing unit required for the CSI report. The CSI report includes a SINR measurement result.

In an embodiment of the present disclosure, the CSI report is a semi-persistent CSI report; and the time occupied by the CSI processing unit required for the CSI report is from a first symbol to a second symbol.

The first symbol is a $1^{st}$ symbol in the earliest transmission occasion of a first RS resource and a second RS resource used for SINR calculation.

The second symbol is a $Z_i^{tth}$ symbol after the last symbol of the latest RS resource in a transmission occasion of the first RS resource and the second RS resource used for the SINR calculation.

The first RS resource is a periodic or semi-persistent CSI-RS resource or SSB resource used for channel measurement.

The second RS resource is a periodic or semi-persistent CSI-RS resource or SSB resource used for the interference measurement.

In an embodiment of the present disclosure, the CSI report is an aperiodic CSI report; and the time occupied by the CSI processing unit required for the CSI report is from a third symbol to a fourth symbol.

The third symbol is a $1^{st}$ symbol after a physical downlink control channel PDCCH configured to trigger the CSI report.

The fourth symbol is the last symbol between a $Z_j^{th}$ symbol and a $Z_j^{tth}$ symbol.

The $Z_j^{th}$ symbol is a $Z_j^{th}$ symbol after the first symbol after the PDCCH configured to trigger the CSI report.

The $Z_j^{tth}$ symbol is a $Z_j^{tth}$ symbol after the last symbol of the latest RS resource between a third RS resource and a fourth RS resource used for the SINR calculation.

The third RS resource is a periodic or semi-persistent CSI-RS resource or SSB resource used for the channel measurement.

The fourth RS resource is a periodic or semi-persistent CSI-RS resource or SSB resource used for the interference measurement.

In an embodiment of the present disclosure, a configuration parameter of a CSI-RS resource set used for channel measurement in the configuration information does not include a trs-info parameter, and/or a configuration parameter of a CSI-RS resource set used for interference measurement in the configuration information does not include the trs-info parameter.

In an embodiment of the present disclosure, the configuration information may include any one of the following:

one RS resource setting; one RS resource setting used for RSRP measurement; one CMR setting; or CMR information.

The first determining module 302 may be specifically configured to determine that the measurement target is the RSRP measurement.

In an embodiment of the present disclosure, a configuration parameter of the CSI-RS resource set in the configuration information does not include a trs-info parameter.

An embodiment of the present disclosure further provides an apparatus for determining a measurement target, applied to a network side device. The apparatus for determining a measurement target, applied to a network side device, may include: a sending module, configured to send configuration information to a terminal device, where the configuration information includes that a parameter reportQuantity is set to null, and the configuration information is used by the terminal device to determine the measurement target, where the measurement target includes SINR measurement or RSRP measurement.

In an embodiment of the present disclosure, the configuration information may include any one of the following:

a plurality of RS resource settings; at least one RS resource setting used for channel measurement and at least one RS resource setting used for interference measurement; at least one CMR setting and at least one IMR setting; or CMR information and IMR information.

In an embodiment of the present disclosure, the configuration information is further used to indicate that a quantity ratio of the CMR to the IMR included in the RS resource is a preset ratio.

In an embodiment of the present disclosure, the apparatus for determining a measurement target, applied to a network side device, may further include:

a determining module, configured to determine the time occupied by a CSI processing unit required for a CSI report, where the CSI report includes a SINR measurement result.

In an embodiment of the present disclosure, the CSI report is a semi-persistent CSI report; and the time occupied by the CSI processing unit required for the CSI report is from a first symbol to a second symbol.

The first symbol is a $1^{st}$ symbol in the earliest transmission occasion of a first RS resource and a second RS resource used for SINR calculation.

The second symbol is a $Z_i^{'th}$ symbol after the last symbol of the latest RS resource in a transmission occasion of the first RS resource and the second RS resource used for the SINR calculation.

The first RS resource is a periodic or semi-persistent channel state information-reference signal CSI-RS resource or a synchronization signal block SSB resource used for the channel measurement.

The second RS resource is a periodic or semi-persistent CSI-RS resource or SSB resource used for the interference measurement.

In an embodiment of the present disclosure, the CSI report is an aperiodic CSI report; and the time occupied by the CSI processing unit required for the CSI report is from a third symbol to a fourth symbol.

The third symbol is a $1^{st}$ symbol after a physical downlink control channel PDCCH configured to trigger the CSI report.

The fourth symbol is the last symbol between a $Z_j^{th}$ symbol and a $Z_j^{'th}$ symbol.

The $Z_j^{th}$ symbol is a $Z_j^{th}$ symbol after the first symbol after the PDCCH configured to trigger the CSI report.

The $Z_j^{'th}$ symbol is a $Z_j^{'th}$ symbol after the last symbol of the latest RS resource between a third RS resource and a fourth RS resource used for the SINR calculation.

The third RS resource is a periodic or semi-persistent CSI-RS resource or SSB resource used for the channel measurement.

The fourth RS resource is a periodic or semi-persistent CSI-RS resource or SSB resource used for the interference measurement.

In an embodiment of the present disclosure, a configuration parameter of a CSI-RS resource set used for channel measurement in the configuration information does not include a trs-info parameter, and/or a configuration parameter of a CSI-RS resource set used for interference measurement in the configuration information does not include the trs-info parameter.

In an embodiment of the present disclosure, the configuration information may include any one of the following:
one RS resource setting; one RS resource setting used for RSRP measurement; one CMR setting; or CMR information.

In an embodiment of the present disclosure, a configuration parameter of the CSI-RS resource set in the configuration information does not include a trs-info parameter.

An embodiment of the present disclosure further provides a terminal device, including a processor, a memory, and a computer program that is stored in the memory and that can be run on the processor. When the computer program is executed by the processor, processes of the foregoing embodiments of the method for determining a measurement target, applied to a terminal device, are implemented, and a same technical effect can be achieved. To avoid repetition, details are not described herein.

Figure 4:
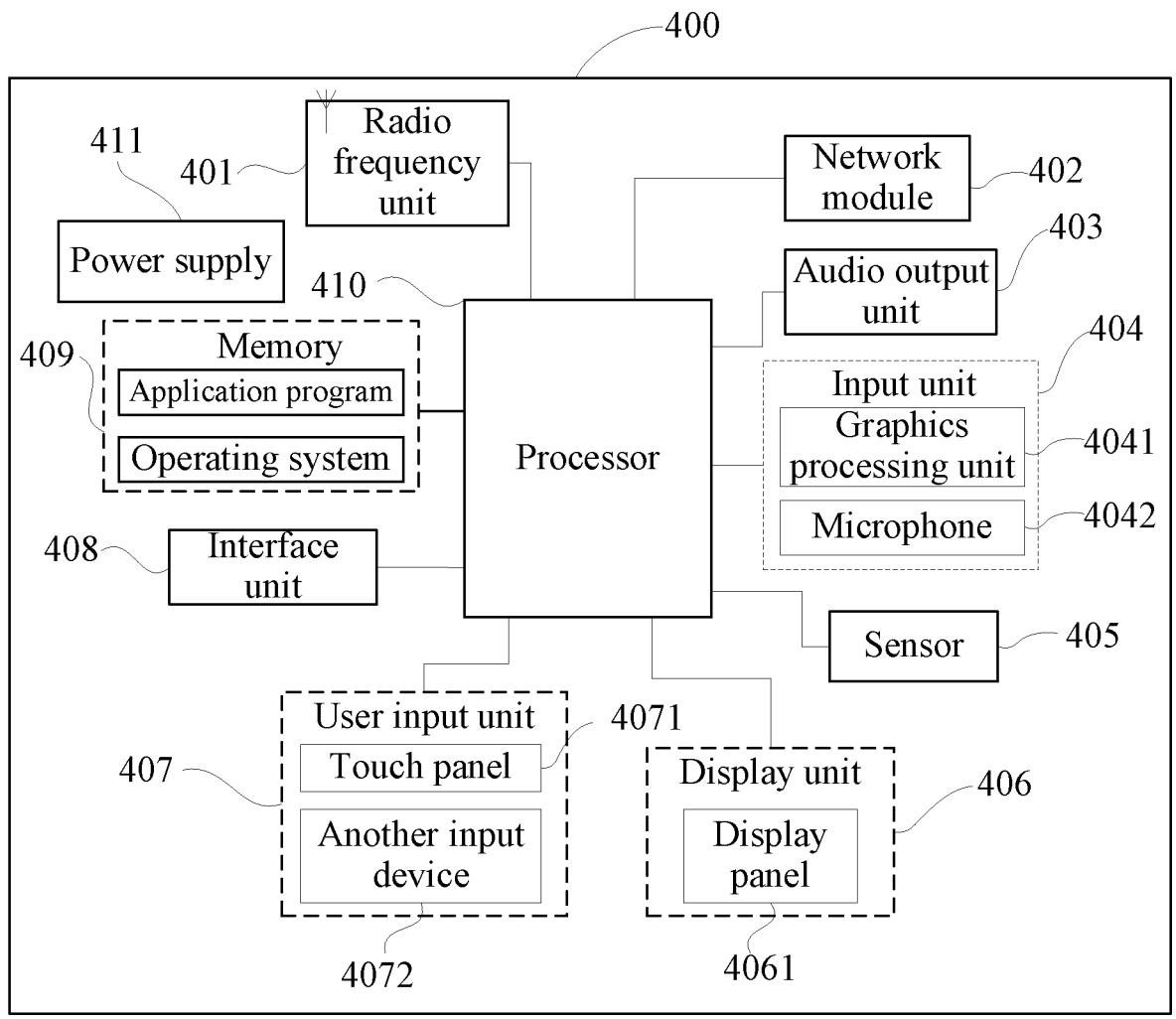
FIG. 4 is a schematic diagram of a hardware structure of an example of a terminal device according to an embodiment of the present disclosure.

FIG. 4 is a schematic diagram of a hardware structure of an example of a terminal device according to an embodiment of the present disclosure. The terminal device 400 includes, but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and the like. It can be understood by a person skilled in the art that, a structure of the terminal device shown in FIG. 4 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a laptop computer, a palmtop computer, an in-vehicle terminal, a wearable device, a pedometer, and the like.

The radio frequency unit 401 is configured to receive configuration information from a network side device, where the configuration information includes that a parameter reportQuantity of a CSI report is set to null, and the configuration information is used by the terminal device to determine the measurement target, where the measurement target includes SINR measurement or RSRP measurement; and The memory 409 may be configured to store a software program and various kinds of data. The memory 409 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 409 may include a high-speed random access memory, and may further include a non-volatile memory such as at least one magnetic disk storage device, a flash memory device, or another volatile solid-state storage device.

The processor 410 is a control center of the terminal device, is connected to each part of the entire terminal device by using various interfaces and lines, and performs various functions of the terminal device and data processing by running or executing the software program and/or a module that are/is stored in the memory 409 and invoking data stored in the memory 409, to perform overall monitoring on the terminal device. The processor 410 may include one or more processing units. In some embodiments, an application processor and a modem processor may be integrated into the processor 410. The application processor mainly processes an operating system, a user interface, an application, and the like. The modem processor mainly processes wireless communication. It may be understood that, alternatively, the modem processor may not be integrated into the processor 410.

According to this embodiment, the processor 410 can run a computer program that is stored in the memory 409 to implement various processes of the method for determining a measurement target, applied to a terminal device. For example, the processor 410 is configured to determine the measurement target according to the configuration information.

According to this embodiment of the present disclosure, when the parameter reportQuantity is set to null, the measurement target can be determined, and then corresponding measurement can be performed.

It should be understood that in this embodiment of the present disclosure, the radio frequency unit 401 may be configured to receive and transmit information, or receive and transmit signals during a call. Specifically, the radio frequency unit receives downlink data from a base station, and transmits the downlink data to the processor 410 for processing; and transmits uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may further communicate with another device by using a wireless communications system and network.

The terminal device provides wireless broadband Internet access for the user by using the network module 402, for example, helping the user send and receive an e-mail, browse a web page, and access streaming media.

The audio output unit 403 may convert audio data received by the radio frequency unit 401 or the network module 402 or stored in the memory 409 into an audio signal, and output the audio signal into sound. In addition, the audio output unit 403 may further provide an audio output (for example, call signal receiving sound or message receiving sound) related to a specific function performed by the terminal device 400. The audio output unit 403 includes a loudspeaker, a buzzer, a receiver, and the like.

The input unit 404 is configured to receive an audio signal or a video signal. The input unit 404 may include a graphics processing unit (GPU) 4041 and a microphone 4042. The graphics processing unit 4041 processes image data of a static image or video obtained by an image capture apparatus (such as, a camera) in a video capture mode or an image capture mode. A processed image frame may be displayed on the display unit 406. The image frame processed by the graphics processing unit 4041 may be stored in the memory 409 (or another storage medium) or sent by using the radio frequency unit 401 or the network module 402. The microphone 4042 may receive a sound and can process such a sound into audio data. Processed audio data may be converted, in a call mode, into a format that can be sent to a mobile communication base station by using the radio frequency unit 401 for output.

The terminal device 400 further includes at least one sensor 405, such as an optical sensor, a motion sensor, and other sensors. Specifically, the light sensor includes an ambient light sensor and a proximity sensor. The ambient light sensor may adjust luminance of the display panel 4061 based on brightness of ambient light. The proximity sensor may turn off the display panel 4061 and/or backlight when the terminal device 400 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information entered by a user or information provided for a user. The display unit 406 may include a display panel 4061, and the display panel 4061 may be configured in a form of Liquid Crystal Display (LCD), Organic Light-Emitting Diode (OLED), or the like.

The user input unit 407 may be configured to receive input digit or character information, and generate a key signal input related to a user setting and function control of the terminal device. Specifically, the user input unit 407 includes a touch panel 4071 and another input device 4072. The touch panel 4071 is also referred to as a touchscreen, and may collect a touch operation performed by the user on or near the touch panel 4071 (for example, an operation performed on or near the touch panel 4071 by the user by using any appropriate object or accessory such as a finger or a stylus). The touch panel 4071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 410, and receives and executes a command from the processor 410. In addition, the touch panel 4071 may be implemented by various types, such as a resistive type, a capacitive type, an infrared type, a surface acoustic wave type, or the like. In addition to the touch panel 4071, the user input unit 407 may further include another input device 4072. Specifically, the another input device 4072 may include but is not limited to a physical keyboard, a function key (for example, a volume control key. an on/off key), a trackball, a mouse, and a joystick. Details are not described herein again.

Further, the touch panel 4071 may cover the display panel 4061. After detecting the touch operation on or near the touch panel 4071, the touch panel transmits the touch operation to the processor 410 to determine a type of a touch event, and then the processor 410 provides corresponding visual output on the display panel 4061 based on the type of the touch event. In FIG. 4, although the touch panel 4071 and the display panel 4061 are used as two independent parts to implement input and output functions of the terminal device, in some embodiments, the touch panel 4071 and the display panel 4061 may be integrated to implement the input and output functions of the terminal device. This is not specifically limited herein.

The interface unit 408 is an interface for connecting an external apparatus with the terminal device 400. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 408 may be configured to receive input (for example, data information and power) from an external apparatus and transmit the received input to one or more elements in the terminal device 400 or may be configured to transmit data between the terminal device 400 and the external apparatus.

The terminal device 400 may further include the power supply 411 (such as a battery) that supplies power to each component. In some embodiments, the power supply 411 may be logically connected to the processor 410 by using a power management system, to implement functions such as charging, discharging, and power consumption management by using the power management system.

In addition, the terminal device 400 includes some functional modules not shown, and details are not described herein.

An embodiment of the present disclosure further provides a network side device, including a processor, a memory, and a computer program that is stored in the memory and that can be run on the processor. When the computer program is executed by the processor, processes of the foregoing embodiments of the method for determining a measurement target, applied to a network device, are implemented, and a same technical effect can be achieved. To avoid repetition, details are not described herein.

Figure 5:
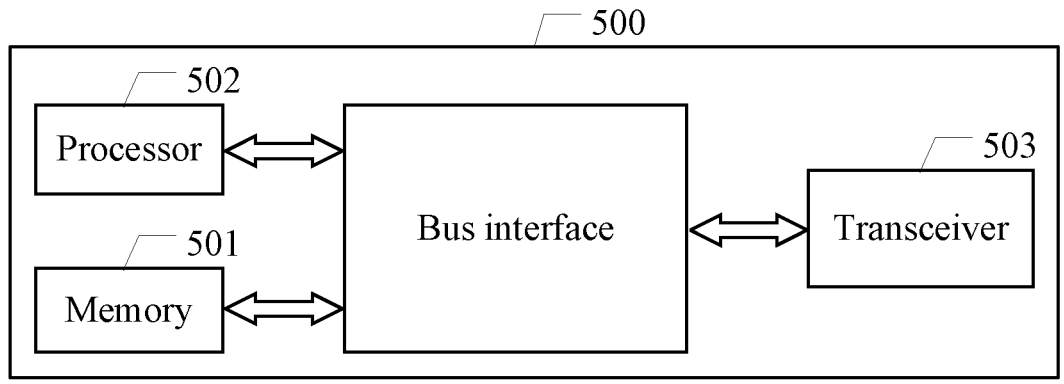
FIG. 5 is a schematic diagram of a hardware structure of a network side device according to an embodiment of the present disclosure.

FIG. 5 is a schematic diagram of a hardware structure of a network side device according to an embodiment of the present disclosure. The network side device includes: a memory 501, a processor 502, a transceiver 503, and a computer program that is stored in the memory 501 and that can be run by the processor 502.

The transceiver 503 may be configured to send configuration information to a terminal device, where the configuration information includes that a parameter reportQuantity is set to null, and the configuration information is used by the terminal device to determine the measurement target, where the measurement target includes SINR measurement or RSRP measurement.

In FIG. 5, a bus architecture may include any quantity of interconnected buses and bridges, and specifically links various circuits of one or more processors represented by the processor 502 and a memory represented by the memory 501. The bus architecture may further link various other circuits such as those of a peripheral device, a voltage regulator, and a power management circuit. These are well known in the art, and therefore are not further described in this specification. The bus interface provides an interface. The transceiver 503 may be a plurality of elements, namely, include a transmitter and a transceiver, and provide a unit configured to communicate with various other apparatuses on a transmission medium, and is configured to receive and send data under the control of the processor 502. The processor 502 is responsible for managing the bus architecture and common processing, and the memory 501 may store data used when the processor 502 performs an operation.

According to this embodiment, the processor 502 can run a computer program stored in the memory 501, and processes of the foregoing embodiments of the method for determining a measurement target, applied to a network device, are implemented, and a same technical effect can be achieved. To avoid repetition, details are not described herein.

An embodiment of the present disclosure further provides a computer-readable storage medium. The computer-readable storage medium stores a computer program instruction. When the computer program instruction is executed by a processor, processes of the embodiments of the method for determining a measurement target, applied to a terminal device, according to the embodiments of the present disclosure, or processes of the embodiments of the method for determining a measurement target, applied to a network side device, according to the embodiments of the present disclosure are implemented, and a same technical effect can be achieved. To avoid repetition, details are not described herein again. An example of the computer-readable storage medium includes a non-transitory computer-readable storage medium, such as a Read-Only Memory (ROM), a Random Access Memory) RAM), a magnetic disk, an optical disc, or the like.

The foregoing describes the aspects of the present disclosure with reference to flowcharts and/or block diagrams of the method, the apparatus (system), and the computer program product according to the embodiments of the present disclosure. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

It should be noted that in this specification, the terms "comprise", "include" and any other variants thereof are intended to cover non-exclusive inclusion, so that a process, a method, an article, or an apparatus that includes a series of elements not only includes those elements, but may also include other elements not expressly listed, or also include elements inherent to this process, method, article, or apparatus. An element limited by "includes a . . . " does not, without more constraints, preclude the presence of additional identical elements in the process, method, article, or apparatus that includes the element.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection scope of the present disclosure.

The invention claimed is:

1. A method for determining a measurement target, comprising:
receiving configuration information from a network side device, wherein the configuration information comprises that a parameter reportQuantity of a Channel State Information (CSI) report is set to null, and the configuration information is used for a terminal device to determine the measurement target, wherein the measurement target comprises a Signal to Interference plus Noise Ratio (SINR) measurement or a Reference Signal Received Power (RSRP) measurement; and
determining the measurement target according to the configuration information,
wherein the configuration information comprises any one of the following:
at least one Reference Signal (RS) resource setting used for channel measurement and at least one RS resource setting used for interference measurement; or
at least one Channel Measurement Resource (CMR) setting and at least one Interference Measurement Resource (IMR) setting; and determining the measurement target according to the configuration information comprises:
  determining that the measurement target is the SINR measurement.

2. The method according to claim 1, wherein a configuration parameter of a Channel State Information-Reference Signal (CSI-RS) resource set used for the channel measurement in the configuration information does not comprise a tracking reference signal information trs-info parameter, or a configuration parameter of the CSI-RS resource set used for the interference measurement in the configuration information does not comprise the trs-info parameter.

3. The method according to claim 1, further comprising:
  determining, according to the configuration information, that a quantity ratio of the CMR to the IMR is a preset ratio.

4. The method according to claim 1, further comprising:
  determining the time occupied by a CSI processing unit required for the CSI report, wherein the CSI report comprises a SINR measurement result.

5. The method according to claim 4, wherein the CSI report is a semi-persistent CSI report; and the time occupied by the CSI processing unit required for the CSI report is from a first symbol to a second symbol,
  wherein:
  the first symbol is a $1^{st}$ symbol in the earliest transmission occasion of a first RS resource and a second RS resource used for SINR calculation;
  the second symbol is a $Z_i^{th}$ symbol after the last symbol of the latest RS resource in a transmission occasion of the first RS resource and the second RS resource used for the SINR calculation;
  the first RS resource is a periodic or semi-persistent Channel State Information-Reference Signal (CSI-RS) resource or a Synchronization Signal Block (SSB) resource used for the channel measurement; and
  the second RS resource is a periodic or semi-persistent CSI-RS resource or SSB resource used for the interference measurement.

6. The method according to claim 4, wherein the CSI report is an aperiodic CSI report; and the time occupied by the CSI processing unit required for the CSI report is from a third symbol to a fourth symbol,
  wherein:
  the third symbol is a $1^{st}$ symbol after a Physical Downlink Control Channel (PDCCH) configured to trigger the CSI report;
  the fourth symbol is the last symbol between a $Z_j^{th}$ symbol and a $Z_j^{'th}$ symbol;
  the $Z_j^{th}$ symbol is a $Z_j^{th}$ symbol after the first symbol after the PDCCH configured to trigger the CSI report;
  the $Z_j^{'th}$ symbol is a $Z_j^{'th}$ symbol after the last symbol of the latest RS resource between a third RS resource and a fourth RS resource used for SINR calculation;
  the third RS resource is a periodic or semi-persistent CSI-RS resource or Synchronization Signal Block (SSB) resource used for the channel measurement; and
  the fourth RS resource is a periodic or semi-persistent CSI-RS resource or SSB resource used for the interference measurement.

7. The method according to claim 1, further comprising:
  determining that the measurement target is the RSRP measurement when the configuration information comprises one CMR setting.

8. The method according to claim 7, wherein a configuration parameter of a Channel State Information-Reference Signal (CSI-RS) resource set in the configuration information does not comprise a trs-info parameter.

9. A terminal device, comprising: a memory storing a computer program and a processor, wherein the computer program, when executed by the processor, cause the processor to execute operations for determining a measurement target, the operations comprising:
  receiving configuration information from a network side device, wherein the configuration information comprises that a parameter reportQuantity of a Channel State Information (CSI) report is set to null, and the configuration information is used for a terminal device to determine the measurement target, wherein the measurement target comprises a Signal to Interference plus Noise Ratio (SINR) measurement or a Reference Signal Received Power (RSRP) measurement; and
  determining the measurement target according to the configuration information,
  wherein the configuration information comprises any one of the following:
    at least one Reference Signal (RS) resource setting used for channel measurement and at least one RS resource setting used for interference measurement; or
    at least one Channel Measurement Resource (CMR) setting and at least one Interference Measurement Resource (IMR) setting; and
  determining the measurement target according to the configuration information comprises:
    determining that the measurement target is the SINR measurement.

10. The terminal device according to claim 9, wherein the operations further comprise:
  determining, according to the configuration information, that a quantity ratio of the CMR to the IMR is a preset ratio.

11. The terminal device according to claim 9, wherein a configuration parameter of a Channel State Information-Reference Signal (CSI-RS) resource set used for the channel measurement in the configuration information does not comprise a tracking reference signal information trs-info parameter, or a configuration parameter of the CSI-RS resource set used for the interference measurement in the configuration information does not comprise the trs-info parameter.

12. A network side device, comprising: a memory storing a computer program and a processor, wherein the computer program, when executed by the processor, cause the processor to execute operations for determining a measurement target, the operations comprising:
  sending configuration information to a terminal device, wherein the configuration information comprises a parameter reportQuantity of a Channel State Information (CSI) report that is set to null, and the configuration information is used by the network side device to determine the measurement target, wherein the measurement target comprises a Signal to Interference plus Noise Ratio (SINR) measurement or a Reference Signal Received Power (RSRP) measurement,
  wherein the configuration information comprises any one of the following:
    at least one Reference Signal (RS) resource setting used for channel measurement and at least one RS resource setting used for interference measurement; or at least one Channel Measurement Resource (CMR) setting and at least one Interference Measurement Resource (IMR) setting; and determining the measurement target according to the configuration information comprises;

determining that the measurement target is the SINR measurement.

13. The network side device according to claim 12, wherein a configuration parameter of a CSI-RS resource set used for the channel measurement in the configuration information does not comprise a trs-info parameter, or a configuration parameter of the CSI-RS resource set used for the interference measurement in the configuration information does not comprise the trs-info parameter.

14. The network side device according to claim 12, wherein the configuration information is further used to indicate that a quantity ratio of the CMR to the IMR comprised in the RS resource is a preset ratio.

15. The network side device according to claim 12, wherein the operations further comprise:

determining the time occupied by a CSI processing unit required for the CSI report, wherein the CSI report comprises a SINR measurement result.

16. The network side device according to claim 15, wherein the CSI report is a semi-persistent CSI report; and the time occupied by the CSI processing unit required for the CSI report is from a first symbol to a second symbol, wherein:

the first symbol is a $1^{st}$ symbol in the earliest transmission occasion of a first RS resource and a second RS resource used for SINR calculation;

the second symbol is a $Z_i^{'th}$ symbol behind the last symbol of the latest RS resource in a transmission occasion of the first RS resource and the second RS resource used for the SINR calculation;

the first RS resource is a periodic or semi-persistent Channel State Information-Reference Signal (CSI-RS) resource or a Synchronization Signal Block (SSB) resource used for the channel measurement; and the second RS resource is a periodic or semi-persistent CSI-RS resource or SSB resource used for the interference measurement.

17. The network side device according to claim 15, wherein the CSI report is an aperiodic CSI report; and the time occupied by the CSI processing unit required for the CSI report is from a third symbol to a fourth symbol, wherein:

the third symbol is a $1^{st}$ symbol after a Physical Downlink Control Channel (PDCCH) configured to trigger the CSI report;

the fourth symbol is the last symbol between a $Z_j^{th}$ symbol and a $Z_j^{'th}$ symbol;

the $Z_j^{th}$ symbol is a $Z_j^{th}$ symbol after the first symbol after the PDCCH configured to trigger the CSI report;

the $Z_j^{'th}$ symbol is a $Z_j^{'th}$ symbol after the last symbol of the latest RS resource between a third RS resource and a fourth RS resource used for SINR calculation;

the third RS resource is a periodic or semi-persistent CSI-RS resource or Synchronization Signal Block (SSB) resource used for the channel measurement; and the fourth RS resource is a periodic or semi-persistent CSI-RS resource or SSB resource used for the interference measurement.

18. The network side device according to claim 12, wherein the operations further comprise:

determining that the measurement target is the RSRP measurement when the configuration information comprises one CMR setting.

19. The network side device according to claim 18, wherein a configuration parameter of a Channel State Information-Reference Signal (CSI-RS) resource set in the configuration information does not comprise a trs-info parameter.

* * * * *